July 8, 1941.  H. GORDON ET AL  2,248,529
FUEL INJECTION APPARATUS FOR INTERNAL COMBUSTION ENGINES
Filed April 30, 1938  8 Sheets-Sheet 1

INVENTORS
H. Gordon & S. H. Attwood
BY
C. F. Wendroth
ATTORNEY

July 8, 1941.  H. GORDON ET AL  2,248,529
FUEL INJECTION APPARATUS FOR INTERNAL COMBUSTION ENGINES
Filed April 30, 1938  8 Sheets-Sheet 3

INVENTORS
H. Gordon & S. H. Attwood
BY
E. F. Wendroth
ATTORNEY

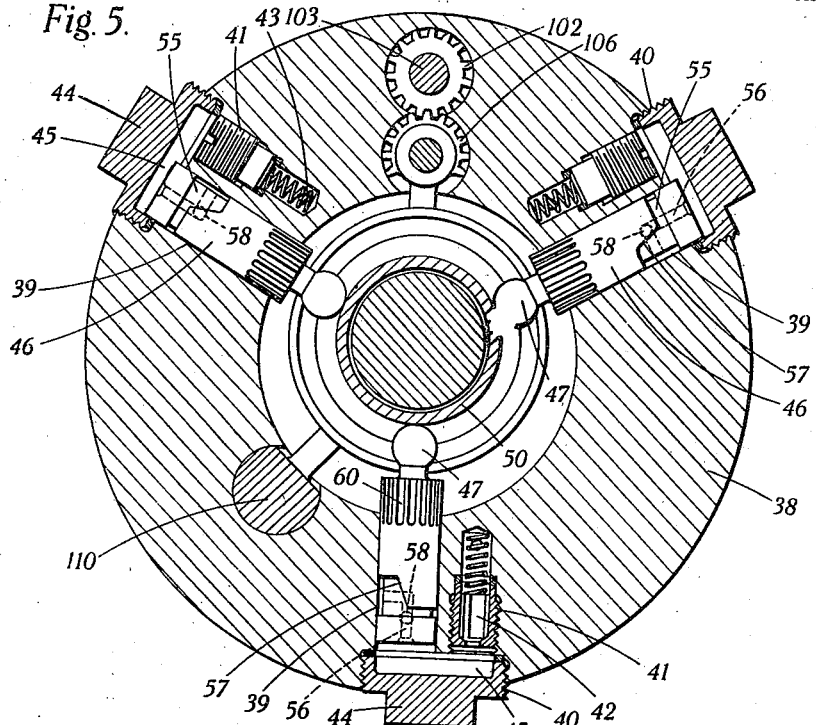
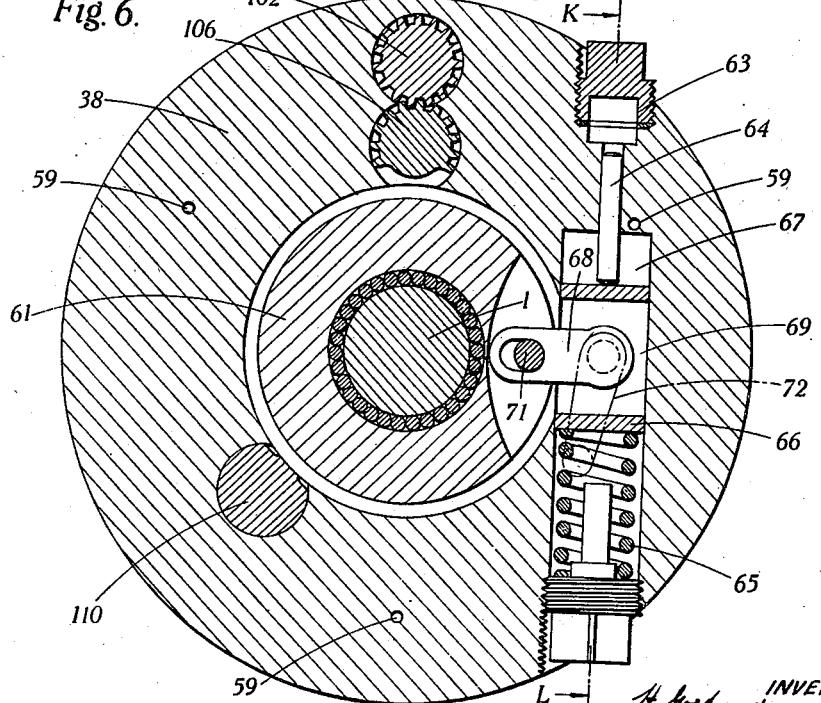

July 8, 1941.   H. GORDON ET AL   2,248,529
FUEL INJECTION APPARATUS FOR INTERNAL COMBUSTION ENGINES
Filed April 30, 1938   8 Sheets-Sheet 5

H. Gordon & S. H. Attwood INVENTORS
BY
E. F. Wendroth
ATTORNEY

July 8, 1941.  H. GORDON ET AL  2,248,529
FUEL INJECTION APPARATUS FOR INTERNAL COMBUSTION ENGINES
Filed April 30, 1938   8 Sheets-Sheet 6

INVENTORS
H. Gordon &
S. H. Attwood
BY
E. F. Wenderoth
ATTORNEY

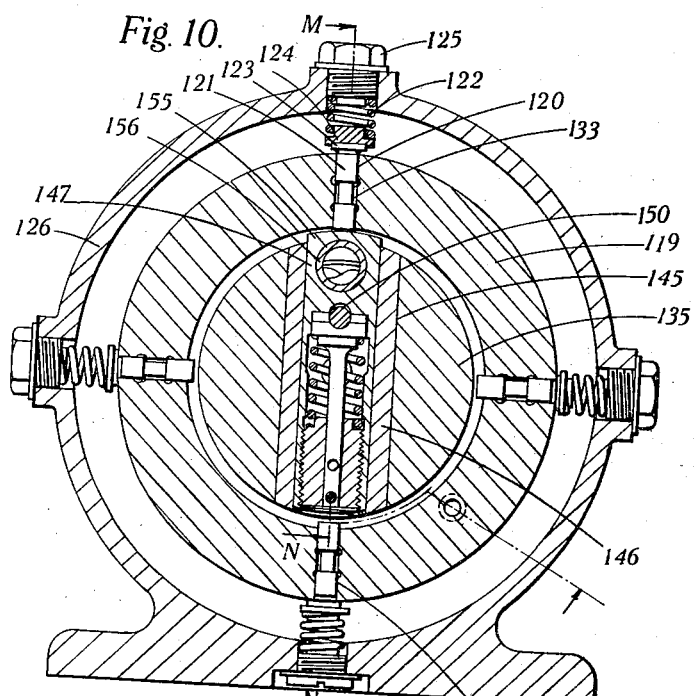

July 8, 1941.                H. GORDON ET AL                2,248,529
           FUEL INJECTION APPARATUS FOR INTERNAL COMBUSTION ENGINES
                    Filed April 30, 1938          8 Sheets-Sheet 8

Patented July 8, 1941

2,248,529

UNITED STATES PATENT OFFICE 2,248,529

FUEL INJECTION APPARATUS FOR INTERNAL COMBUSTION ENGINES

Hamilton Gordon, Weyburn, Elstead, and Stanley Herbert Attwood, New Malden, England, assignors to Attwood Diesel Equipment Company Limited, London, England, a British company Application April 30, 1938, Serial No. 205,339
In Great Britain May 1, 1937

13 Claims. (Cl. 123—140)

The present invention relates to liquid fuel injection systems for internal combustion engines and has for its chief object to provide improved apparatus for injecting liquid fuel into the cylinder or cylinders of an internal combustion engine which is compact in form and is adapted for ready application to any suitable engine, for example, in place of an injection pump of the "jerk" type.

With the above object in view the present invention broadly stated consists in a fuel injection apparatus for supplying liquid fuel to an internal combustion engine of the compression ignition type comprising in combination as a self-contained unit, a pump for delivering fuel at injection pressure, means for regulating said pressure, a distributor for controlling the supply of fuel at injection pressure, said distributor including means for varying the period of fuel injection and means for varying the time of commencement of fuel injection, and speed responsive means for controlling at least one of the aforesaid means in accordance with predetermined requirements.

In order that the present invention may be more clearly understood and readily carried into effect reference may now be made to the accompanying drawings illustrating the same by way of example, and in which—

Fig. 5 is a cross sectional view on the line G—H of Fig. 1.

Fig. 6 is a cross sectional view on the line I—J of Fig. 1.

Fig. 10 is a view through the axes of the control valves of a modified form of distributor.

Fig. 11 is a cross sectional view on the line M—N—O of Fig. 10.

Figure 1:
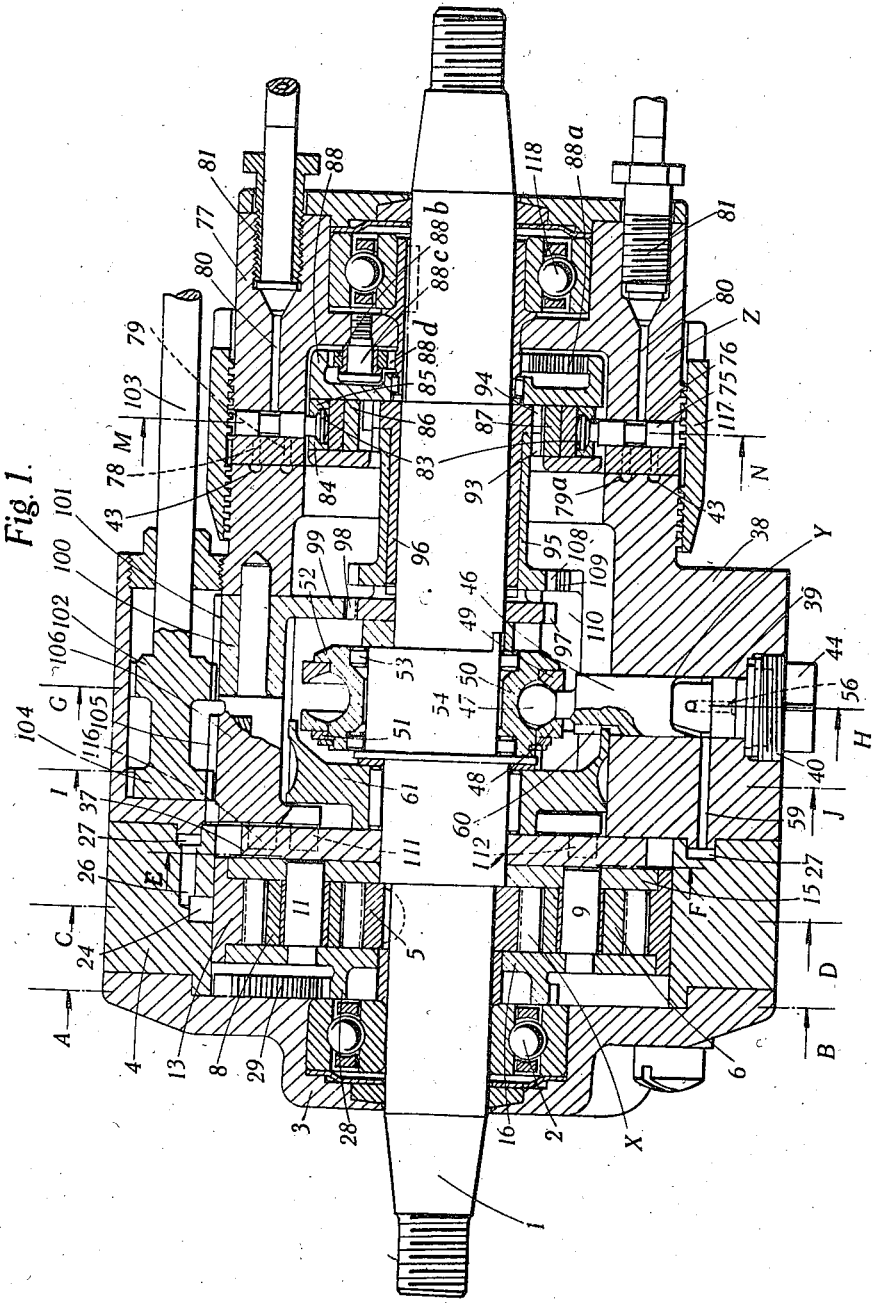
Fig. 1 is a longitudinal cross sectional view of a preferred form of apparatus according to the present invention.
Figure 2:
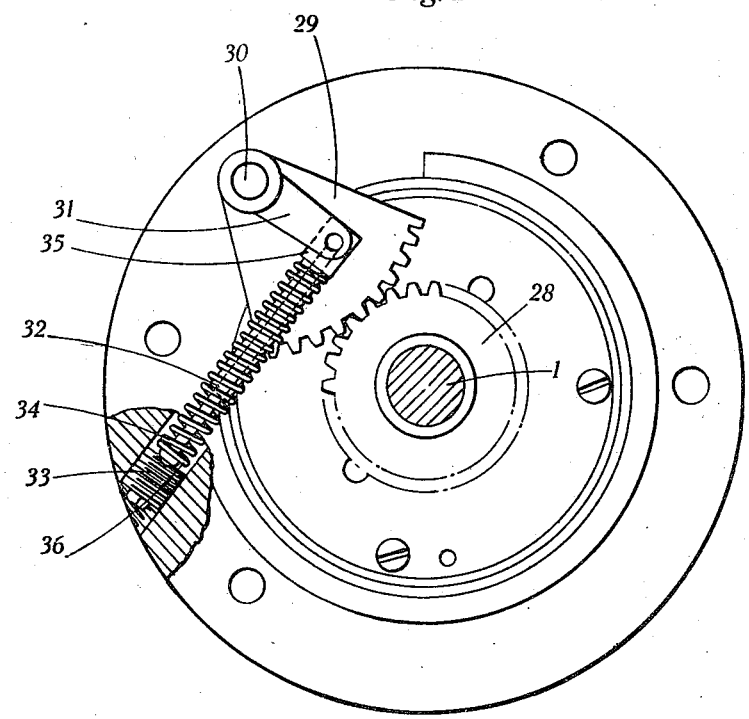
Fig. 2 is a cross sectional view on the line A—B of Fig. 1.

In the accompanying drawings 1 indicates a driving shaft adapted to be driven at or proportional to the engine speed and which is journalled at one end in a bearing 2 mounted in a cover 3 which is secured to the annular casing or housing 4 of a combined speed-responsive-governor and primary fuel pump designated generally by the letter X in Fig. 1. The governor and primary pump X comprises a toothed gear 5 keyed to the shaft 1 and which is in mesh with each of three toothed gears 6, 7, 8 carried upon spindles 9, 10, 11 respectively mounted in a rotatable body 12 apertured centrally loosely to receive the shaft 1 and which bears upon and is rotatable within the housing 4. The body 12 comprises a pump body 13 having a webbed portion 14 bored to accommodate the gears 6, 7, 8 and recessed to receive the front and rear cover plates 15, 16, which are secured to the webbed portion 14 by screws or the like.

The bores for the gears 6, 7, 8 in the webbed portion 14 of the pump body 13 communicate with one another by arcuate channels 17, 18 and the bore for the gear 6 also communicates by way of a channel 19 on the side reemote from that communicating with the bore for the gear 7 with an arcuate recess or groove 20 in the casing 4 which is provided with a socket 21 for a pipe connection with the fuel supply tank. The channel 17 also communicates with an arcuate recess or groove 22 in the casing 4 by way of a channel 23 whilst the bore for the gear 8 communicates on its discharge side with a further recess or groove 24 in the casing 4 by way of a channel 25 of reduced diameter. Each of the recesses or grooves 22, 24 also communicates by way of an axially disposed channel 26 with a groove 27 in the inner face of the casing 4. Each of the gears 6, 7, 8, forms with the gear 5 a gear pump.

The rear cover 16 of the rotatable body 12 is provided as shown with a gear 28 which meshes with a gear sector 29 pivoted at 30 on the casing 4 and having an arm 31 which is pivotally connected with one end of a telescopic strut 32, the other end of which bears upon a stop 33 on the casing 4. A spring 34, which surrounds the strut 32 bears on shoulders 35, 36 at the respective ends of the strut and normally tends to maintain it in an extended condition, and in so doing biases the rotatable body in a clockwise direction as viewed from the left in Fig. 1.

A cam plate 37 for controlling the fuel injection system is secured to the body 12 through the cover plate 15 by screws or in any other convenient manner.

Figure 7:
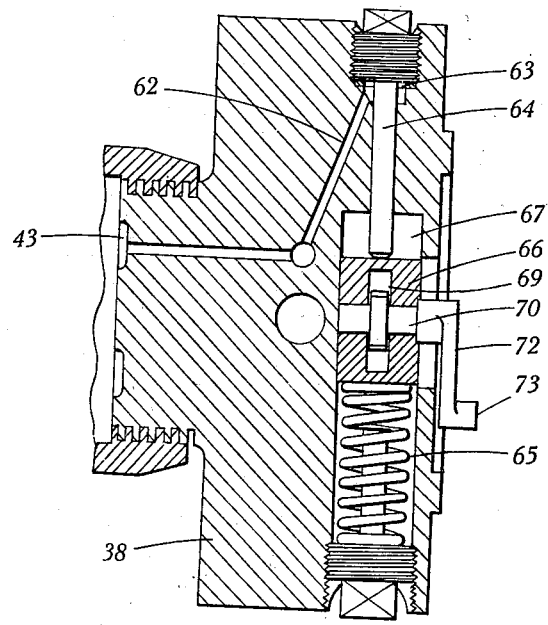
Fig. 7 is a cross sectional view on the line K—L of Fig. 6.
Figure 8:
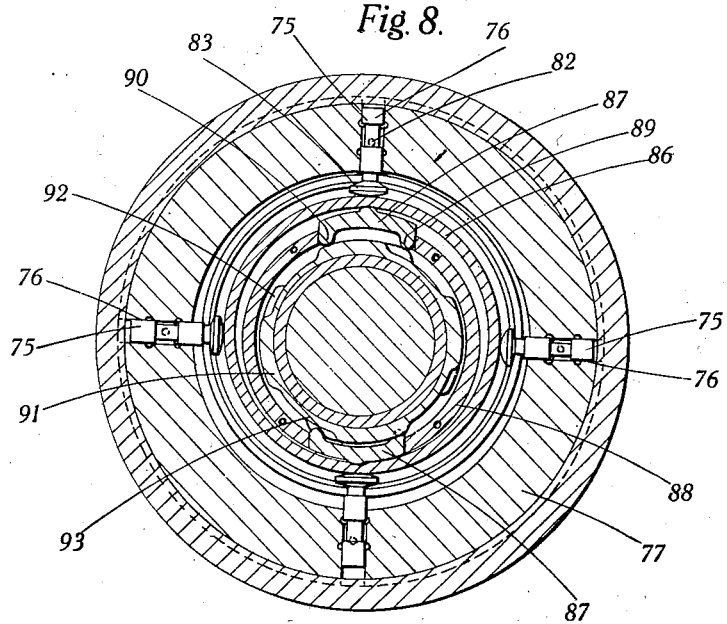
Fig. 8 is a cross sectional view on the line M—N of Fig. 1.
Figure 9:
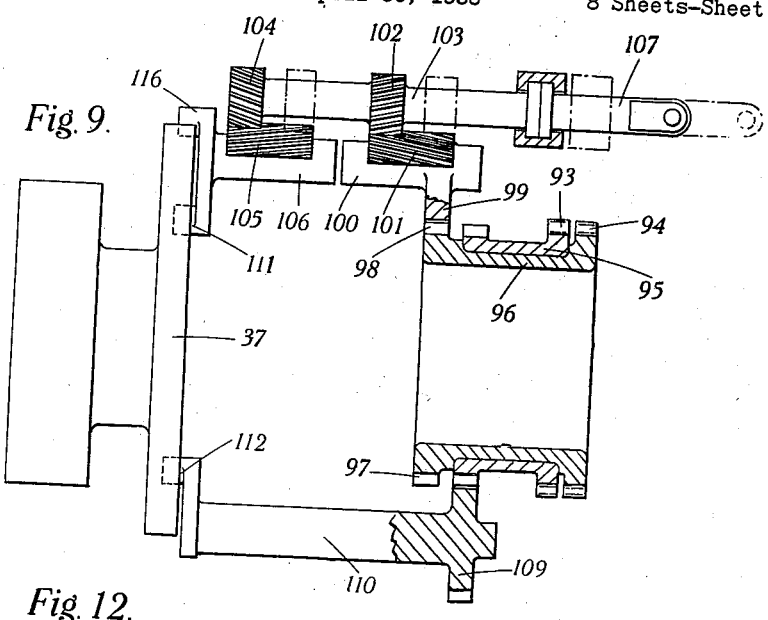
Fig. 9 is a diagrammatic view illustrating the means shown in Fig. 1 for varying the timing and period of injection.

The high pressure pump designated generally at Y in Fig. 1 and cross sectional views of which are also shown in Figs. 5 to 7 comprises a main pump body 38 which is secured to the casing 4 in any convenient manner. The pump body 38 of annular form has three pump cylinders 39 bored radially in it so as to extend completely through the radial thickness of the body. It will be understood, however, that any desired number of pump cylinders may be formed in the pump body 38. An enlarged circular recess 40 is formed in the outer periphery of the body at the position of each pump cylinder 39 so as to embrace both the pump cylinder and a cavity 41 sunk into the body adjacent to and parallel with the cylinder. This cavity houses a spring closed delivery valve 42 for the cylinder and communicates at its inner end with a groove or high pressure conduit 43 common to all the cylinders and which may be formed in the body of the pump or in a further body secured thereto. The recesses are each screw threaded and sealed by a plug 44 which may be recessed out if necessary as shown at 45 to establish communication between the cylinder 39 and the adjacent delivery valve 42. Each cylinder has a plunger 46 slidable therein and the inner end of which (that is, the end nearest the centre of the pump body) is provided with a ball head 47 and all the ball heads of the plungers are held between two laterally arranged rings 48, 49, which are recessed on their adjacent sides to receive the said heads. The rings 48, 49, are carried by an inner ring 50 and are held correctly in place between a nut 51 and a shoulder 52 on the ring 50. The ring 50 forms part of a roller bearing 53 which runs upon an eccentric 54 of the shaft 1.

It will be appreciated that the ball head coupling between the plunger 46 and eccentric 54 not only allows for the relative mutual displacement between the ball heads 47 in the holding rings 48, 49, during operation of the pump but also enables the plungers 46 to be rotated individually about their longitudinal axes. Each plunger 46 is provided with a recess 55 extending peripherally thereof at a short distance from the head of the plunger and which is extended by a passage 56 to the top of said head and hence is in communication with the working cylinder space. This recess has a helically inclined edge 57 extending around a portion of the periphery of the plunger and which is arranged to co-act with a suction port 58 in the pump cylinder wall by overriding the said port during the strokes of the plunger in such a manner that the effective suction stroke starts as soon as the inclined edge overrides the port on the downward movement of the plunger 46 to establish communication between the port and the peripheral recess in the plunger. Similarly the effective delivery stroke of the plunger commences as soon as the inclined edge completely overrides and shuts-off the suction port 58 during the upward movement of the plunger. The suction ports 58 of the several cylinders 39 communicate by means of passage-ways 59 with the groove 27.

By rotating the plunger 46 about its longitudinal axis the point in the delivery stroke of the plunger at which the inclined edge overrides the suction port 58 may be varied, hence the amount and pressure of fuel delivered per cycle of the pump plunger can be adjusted within a predetermined range by rotating the plunger. For rotating the plungers 46 in unison with one another for the purpose of regulating the amount of fuel delivered by the pump the inner end of each plunger is provided with gear teeth 60 extending around a portion of the periphery thereof, the individual teeth extending longitudinally of the plunger. A control ring 61 is rotatably mounted in the pump body and is provided with gear teeth which mesh with the teeth on the plungers so that by rotating the control ring 61 in one direction or the other all the plungers will be similarly rotated in unison and to the same extent, thus providing a device by which the amount and pressure of the liquid delivered by the individual plungers may be varied in common with one another.

The means for varying the amount of the liquid delivered per cycle by the plungers 46 of the pump may comprise any of the well-known arrangements employed in connection with jerk pumps for fuel injection systems. For example, instead of or in conjunction with the arrangement above described in which the suction port co-operates with an inclined edge of a recess in the plunger, a similar arrangement could be provided in which the port is a discharge port so that when the inclined edge overrides this port on its downward movement the pressure in the working chamber of the pump cylinder is instantly relieved and the liquid for the remainder of the stroke of the plunger discharged into a relief conduit. In both the arrangements described the inclined edge could be on the wall of the pump cylinder and the port in the pump plunger. Also instead of rotating the plungers, cylinder bushes provided with teeth at the inner end thereof in lieu of the teeth on the plungers, could be coupled to the control ring so that they are rotatable instead of the plungers, the ports or recesses being then made in these cylinder bushes.

In arrangements in which the plungers are rotated to vary the amount of fuel delivered, the teeth on the plungers, which mesh with those on the control ring 61 could be provided on sleeves rotatably mounted in the pump body but not axially movable and the plungers would then be free to reciprocate in the sleeves but would be keyed thereto so as to be rotated thereby upon movement of the control ring. The control ring above described is the most convenient form of common control member for the pump cylinders and plungers but it is to be understood that any other form of coupling to a common control member may be used as also different forms of coupling the plungers to a common drive therefor.

The groove or high pressure conduit 43 is arranged in communication by means of a conduit 62 with a cylinder 63 in which a plunger 64 operates under the influence of the delivery pressure of the pump against the counter pressure of a spring 65, the initial stress of which may be adjustable; increase of pressure in the groove or conduit 43 displaces the plunger 64 to an increased extent against the influence of the spring 65 and reduction of delivery pressure causes the plunger to be moved in the opposite direction by the spring. In view of the high pressures being dealt with, the piston surface of the plunger 64 against which the fuel pressure acts may be less than the cross sectional area of the cylinder 63, thus enabling the spring 65 to be relatively light. Furthermore, the plunger 64 is preferably connected to another larger plunger 66 which may be termed the regulating plunger operating in an enlarged bore 67.

The regulating plunger 66 is operatively connected to the control ring 61 of the pump in such a manner that with increasing displacement of the plunger 66 by the fuel pressure the pump is regulated to give a reduced output and vice versa and, other conditions remaining the same, the regulator will operate to maintain at any given speed a substantially constant pressure of the fuel in the high pressure conduit or groove 43 which pressure may be predetermined as desired. As shown the operative connection between the regulating plunger 66 and the control ring 61 for the pump plungers comprises a lever 68 one end of which projects into a slot 69 in the plunger 66 and is mounted upon a shaft 70 carried by the plunger 66 whilst the other end is pivotally connected as at 71 to the annular control ring 61. An arm 72 is connected to the shaft 70 and has a pin 73 thereon which is adapted to co-act with a cam form, for example, a cam form 74 in the cam plate 37. The cam form may be moved to rotate the control ring 61 either manually or automatically, as for example by the speed governor X hereinbefore described.

The liquid fuel at high pressure supplied to the high pressure conduit 43 by the pump is distributed to the engine cylinders in correct timed relation and for the correct period in relation to the angular displacement of the engine crankshaft by the distributor designated generally at Z in Fig. 1 and which comprises one or more control valves 75 arranged in radial disposed cylindrical holes 76 in the distributor body portion 77, the holes 76 communicating respectively by way of channels 78, 79 with groove 43 and with a groove 79a the outlet of which is controlled by a relief valve (not shown) for maintaining a predetermined residual pressure in the groove 79a. A channel 80 communicates with each hole 76 at a position between the channels 78, 79, and is in communication with a screw-threaded recess 81 into which a nipple may be screwed for the purpose of connecting the channel 80 to a pipe for delivering fuel to an injector. Each control valve 75 is provided with a recessed portion 82 to enable communication to be established either between the channels 78 and 80 or between the channels 79 and 80 depending upon the position of the valve 75. Each valve 75 has an enlarged head 83 at its innermost end and the several heads 83 have an accurate working fit in between the rings 84 and 85 and the floating ring 86 to which an eccentric movement is imparted by a pair of rockers 87 pivotally carried at diametrically opposite positions by a cylindrical member 88 driven from the shaft 1 by engagement of teeth 88a thereon with a pinion or pinions 88b carried by shafts 88c supported in the body portion 77 and engaging teeth on a pinion 88d keyed to the shaft 1. As illustrated the member 88 is adapted to be driven at half engine speed. The rockers 87 are mounted in the member 88 so as to be capable of limited radial, as well as pivotal, movement with respect to the member 88, and have surfaces or arms 89, 90, offset with respect to one another axially of the distributor for co-operation with cams 91, 92, on cam rings 93, 94 carried by sleeves 95, 96. The cams 91, 92 co-operate with the rocker surfaces or arms 89, 90 to cause radial movement of the rockers 87 in such a manner that the ring 86 has an eccentric movement imparted to it, which effects successive operation of the control valves 75.

To enable the timing of the commencement of injection in relation to the engine cycle and/or the period of opening of each control valve to supply fuel to each injector in relation to the angular displacement of the engine crank shaft to be controlled, the sleeve 96 of the period cam ring 94, in this case the innermost ring, is provided with teeth 97 which mesh with similar teeth 98 on a sector 99 secured to a half period control spindle 100 provided with a helically toothed portion 101 with which a pinion 102 mounted upon a shaft 103 meshes. The shaft 103 also carries a pinion 104 which meshes with a helically toothed portion 105 on another half period control spindle 106. The shaft 103 is operatively connected to a rod 107 which is adapted to be coupled with a period control pedal or lever (not shown) by which the driver or operator of the engine can control the period of injection and therefore the power of the engine, movement of this lever or pedal causing axial displacement of the helical toothed pinions 102 and 104 which results in a corresponding rotational movement in one direction or the other of the sleeve 96 carrying the period cams.

The toothed segment 108 of the other sleeve 95 is arranged in mesh with a toothed sector 109 secured to a spindle 110 which is rotatably mounted in the supporting body of the distributor. The two spindles 106 and 110 are adapted to be rotated in unison in any suitable manner so that the cam sleeves 96, 95 can be rotated together through a certain range of movement optionally in one direction or the other and thereby move the two cam rings in unison, thus enabling the timing of the actuation of the control valves, and therefore of the injection, to be varied as may be desired. As shown, the two spindles 106 and 110 are provided with crank pins 111, 112 respectively arranged to co-act with cam forms 113, 114 of the cam plate 37, the arrangement being such that upon rotation of the plate 37 both the spindles 106, 110 will be rotated in unison to effect the advance or retardation of the timing of commencement of injection. With this arrangement the timing is automatically controlled in view of the connection of the cam plate 37 to the speed governor X.

The period of injection can be altered manually if desired under all conditions without alteration in the timing by movement of the rod 107 and shaft 103 and, further, that the advance or retardation in the timing may be given any desired characteristic in relation to speed by suitably forming the cam forms of the cam plate 37. The employment of a speed governor controlled master cam plate also lends itself in a particularly advantageous manner to the provision of a control which automatically stops injection or materially reduces the quantity of fuel injected when a predetermined limiting engine speed is reached. This is effected by providing a suitable contour to the cam in the cam plate 37 which controls the spindle 106 in such a manner that the crank pin 111 of the spindle 106 can be rapidly displaced by the action of a supplementary cam projection 115 of the cam plate 37 on another crank pin 116 provided on the same spindle 106 to rotate the spindle in a direction in which the period of actuation of the control valve and therefore of the injection is reduced or cut out within a few degrees of movement of the master cam plate.

The distributor body portion 77 is secured to the pump body 38 by an internally threaded sleeve 117 which engages with external threads on the body portion 77 and pump body 38 as shown whilst the right hand end of the shaft 1 as viewed in Fig. 1 is carried in a bearing 118 mounted in the body portion 77.

Figure 3:
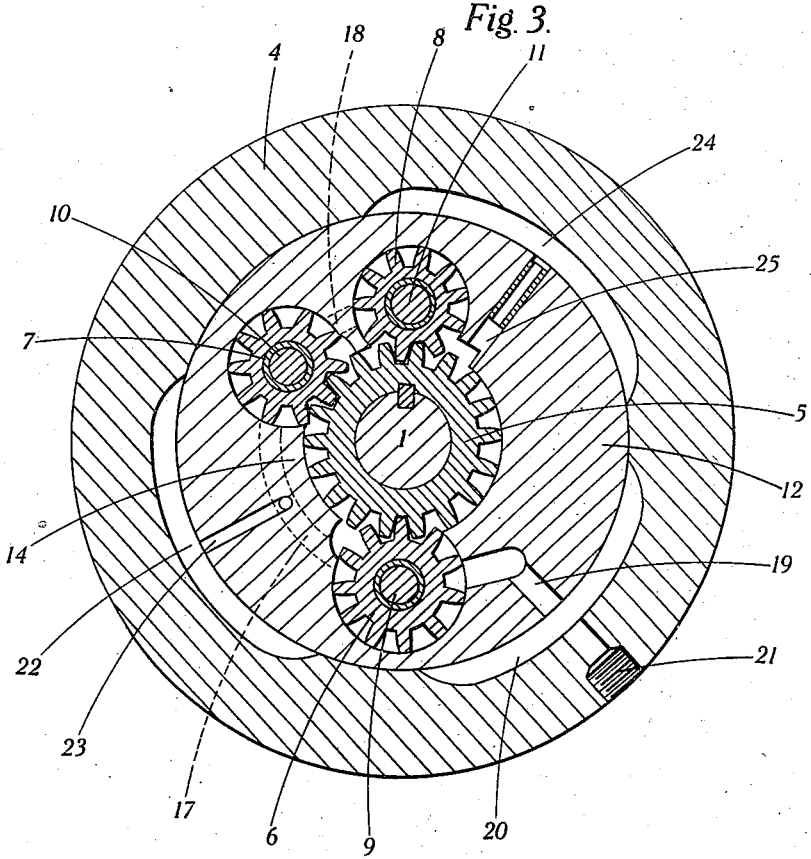
Fig. 3 is a cross sectional view on the line C—D of Fig. 1.
Figure 4:
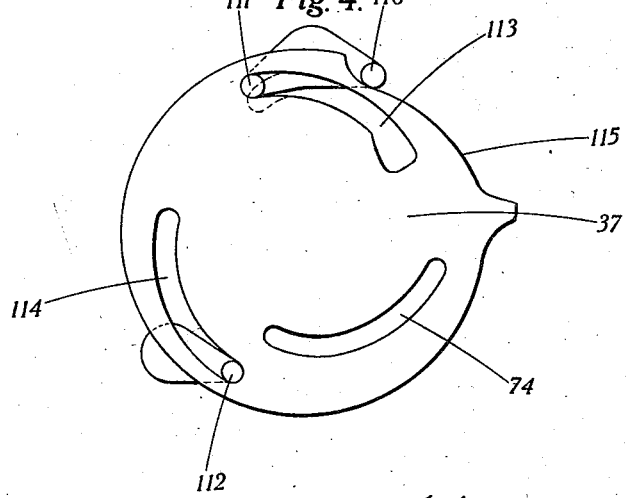
Fig. 4 is a cross sectional view through the cam plate on the line E—F of Fig. 1.

The operation of the apparatus described is as follows:

Upon rotation of the shaft 1 in an anti-clockwise direction as viewed in Fig. 3, the gears 6, 7, 8 are driven in a clockwise direction and liquid fuel is drawn from the fuel supply tank through the socket 21, recess 20 and channel 19 by the pump constituted by the gears 5, 6. This fuel is delivered through the channel 17 to the pump constituted by the gears 5, 7, which pump delivers fuel to the pump constituted by the gears 5, 8, which in turn delivers the fuel through channel 25, recess 24 and channel 26 to the groove 27. The channel 25 is of such cross sectional size that a reaction tending to rotate the rotatable body 12 in an anti-clockwise direction is produced.

It will be appreciated that by suitable selection of the spring 34 and gears 5, 6, 7 and 8 rotary movements of the body 12 corresponding to variations in the speed of the shaft 1 can be produced. Accordingly the cam plate 37 which is secured to the body 12 through the cover plate 15 can be used for controlling members automatically in accordance with the speed of the shaft 1. The delivery of fuel from the groove 27 is controlled by a relief valve (not shown) to maintain a predetermined pressure of fuel in the recesses 22, 24 and channels connected therewith and consequently there is no tendency for fuel to by-pass the pumps 5, 7 and 5, 8 therethrough.

The fuel delivered to the groove 27 forms the intake for the pump Y and upon inward movement of the plungers 46 the fuel is drawn into the pump cylinders 39 to be delivered at high pressure upon movement of the plungers 46 in the reverse direction to the groove or high pressure conduit 43 and forms, as it were, the inlet for the distributor Z. A portion of the fuel at high pressure delivered from the pump cylinders 39 passes by way of the conduits 62 to the pressure regulating means to operate upon the regulating plunger 66 in a manner which will be understood from the foregoing description. In operation the control ring 61 of the pump will be actuated both upon displacement of the cam form 74 produced by rotation of the cam plate 37 and also upon displacement of the regulating plunger 66, rotation of the cam plate 37 varying the effective stroke of the pump plungers 46 to alter the delivery pressure of the pump and displacement of the regulating plunger 66 tending to maintain constant any predetermined delivery pressure. Actually these two operations interact so that the output of the pump is regulated to suit any newly adjusted position of the plunger 66. The result is that when the cam plate 37 is coupled to a speed responsive governor as X the absolute output of the pump per injection is maintained substantially constant with increasing speed or vice-versa, it being borne in mind that as the pressure increases in the high pressure conduit with increasing speed of operation of the pump and therefore of the engine, the amount of fuel discharged from the conduit 43 per injection, for a given duration of opening of each injector valve in relation to crank angle displacement of the engine, will remain unaltered, because an appropriate adjustment in the pressure will have been made to compensate for alteration in absolute period of opening of the injection valve consequent upon change of engine and pump speed. Thus, assuming a duration of opening of each injector valve corresponding to an angular displacement of 10 degrees of the engine crankshaft, an increase of 50 per cent. in engine speed, for example, due to a relief of the load on the engine, will cause an approximately 50 per cent. increase in the pressure of the fuel in the high pressure conduit 43 and therefore at the injector nozzle, and approximately the same amount of fuel will be injected at the higher engine speed as was injected at the lower engine speed per engine cycle.

The fuel delivered to the high pressure conduit 43 is distributed to the engine cylinders by the distributor Z in the manner which will be clear from the foregoing description. The period of injection is terminated by the control valve 75 establishing communication on its return movement between the passage 80 and the groove 79a when the pressure in the injection pipe is reduced to a predetermined residual level, which is maintained by a relief valve (not shown).

It will be clear from the accompanying description that with a given engine speed resulting in a particular basic setting of the regulating plunger the apparatus according to the present invention will function automatically to maintain substantially constant any predetermined injection pressure of the fuel and also to supply the fuel to the individual working cylinders of an engine at a time and during a period to ensure optimum engine performance. Furthermore the period of injection may be varied at any time by suitable operation of the rod 107.

Although in the foregoing description there have been described particular forms of speed-responsive-governor, pump and distributor, other constructional forms thereof may be employed and in Figs. 10-16 inclusive a modified form of distributor is illustrated. The distributor illustrated in these figures comprises an annular body portion 119 the front face of which has a cover plate (not shown) applied thereto while the rear face is adapted to be applied to the pump body. Four equally spaced cylindrical holes 120 are formed radially through the annular body portion 119, and a control valve 121 is provided in each hole 120 and is normally pressed by a spring 122 into an innermost position in which a collar 123 on the outer end of the valve 121 bears against the body portion 119; a washer 124 seats upon the collar 123 and the spring 122 bears at one end on the washer 124 and at its other end on a cap 125 screwed into or otherwise secured to the distributor casing 126. In the rear face of the pump body two grooves 127 and 128 are formed from which channels 129, 130 drilled into the body portion 119 extend to each of the cylindrical holes 120 whilst on the opposite side of body portion 119 a third channel 131 communicates with each cylindrical hole 120 at a position between the other two channels 120, 130, the third channel 131 being in communication with a screw-threaded recess 132 in the front of the body portion 119 into which a nipple may be screwed for the purpose of connecting the third channel to a pipe for delivering fuel to an injector. Each control valve 121 is provided with an annular recess 133 which in the normal innermost position of the control valve establishes communication between the channel 129 from the innermost groove 127 and the third channel 131 located on the other side of the valve whilst in a raised or operative position of the valve the channel 130 from the outermost groove 128 is arranged in communication through the piston recess 133 with the third channel 131. The grooves 127 and 128 are adapted to communicate respectively with a relief valve 134 which maintains fuel at a predetermined residual pressure and with the output side of a high pressure pump.

Figure 12:
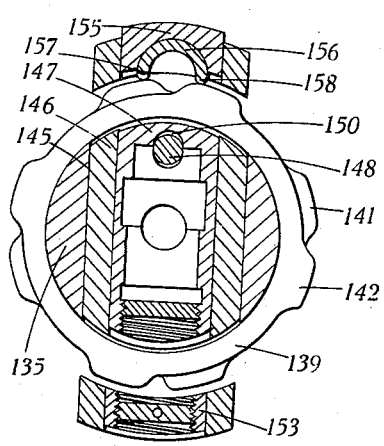
Fig. 12 is a cross sectional view on the line P—Q of Fig. 11.
Figures 13, 14:
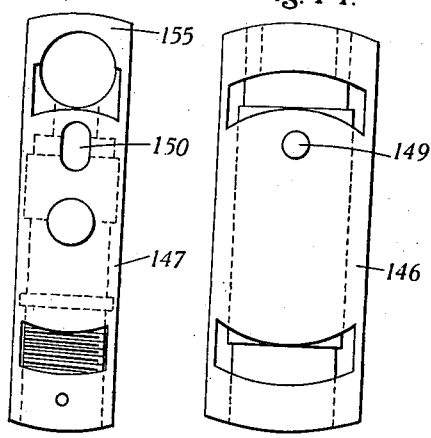
Figs. 13 and 14 are elevational views of a control valve tappet and tappet bush respectively of a distributor as shown in Figs. 10 and 11.
Figures 15, 16:
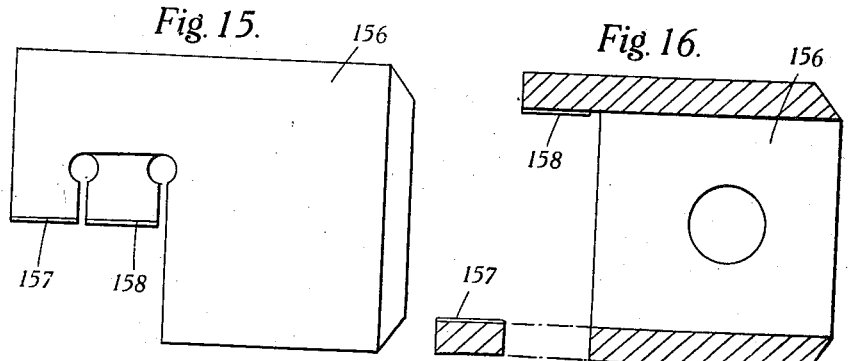
Figs. 15 and 16 are elevational and sectional plan views respectively of a tappet rocker as shown in the distributor of Figs. 10 and 11.

Disposed coaxially within the annular body portion 119 is the enlarged end 135 of a driving shaft 136 adapted to be driven at a suitable speed and upon which relatively rotatable sleeves 137, 138, concentrically arranged with respect to one another and with the shaft are mounted. The inner sleeve 137 abuts at one end against the outer face of the enlarged end 135 of the shaft 136 and extends at its other end slightly beyond the corresponding end of the outer sleeve 138. Cam rings 139, 140 are attached to or formed on the corresponding ends of the sleeves 137, 138, and each cam ring 139, 140 is provided with four projecting cam surfaces 141, 142 as shown in Fig. 12, the cams being associated in pairs one from each ring and each pair being located in the immediate vicinity of one of the control valves 121.

The cams 141, 142 have peaks which are concentric with the axis of the sleeves 137, 138. The other ends of the sleeves 137, 138 located outside the body portion 119 and inside the supporting body each have a toothed segment 143, 144, provided thereon for purposes hereinafter described.

The driving shaft 136 extends through the innermost sleeve 137 and at a position in line with a control valve 121, the enlarged end 135 thereof is provided with a diametrical hole 145 through which extends a tappet bush 146. A hollow cylindrical tappet 147 is disposed within the bush 146 and an abutment 148 extends through circular holes 149 in the bush 146 and slots 150 in the tappet 147 and is firmly secured in the shaft 136 and its enlarged end 135. The slots 150 extend axially of the tappet 147 to permit axial movement of the tappet for actuation of the control valves 121 as will be hereinafter described, and a compression spring 151 reacts between the fixed abutment 148 and a plug 152 screwed into the end 153 of the tappet 147. A strut 154 for the spring extends axially thereof and bears at one end against the abutment 148 and slides at its other end in the plug 152. At the end 155 of the tappet 147 opposite to that which receives the plug 152 the tappet 147 is formed to receive a substantially cylindrical tappet rocker 156 mounted so as to be capable of rotational movement about the longitudinal axis of the rocker and having surfaces 157, 158 for co-operation with the cams 141, 142. The surfaces 157, 158, which may be regarded as rocker arm followers, extend over a predetermined arc in relation to the periphery of the cam rings 139, 140, and are mutually offset in the axial direction of the driving shaft so that one surface or arm 157 co-operates with the cam 141 of one ring 140 and the other surface or arm 158 co-operates with the cam 142 of the other ring 139. The arrangement is such that when the tappet 147 is not actuated by any cam, a slight clearance is provided between the end 155, of the tappet and the inner ends of the control valves 121. If one arm only of the rocker 156 is actuated by a cam the rocker 156 will be rocked or rotated idly without displacing the tappet whereas if both arms of the rocker 156 are actuated jointly by cams the rocker 156 and tappet 147 therewith will be displaced radially to move a control valve to an extent which places the channel 130 from the outer annular groove 128 in communication with the third channel 131 hereinbefore mentioned. For a minimum period of actuation of a control valve (corresponding to a minimum period of opening of an injector valve in relation to engine crank angle displacement) the cams of each pair will be so positioned relatively to one another that as the tappet 147 is rotated first one surface or arm of the rocker 156 rides on to its cam and reaches a position closely approaching the end of the said cam before the other surface or arm of the rocker 156 rides on to its corresponding cam so that after a short further movement from the point where the latter surface arm is lifted by its cam and the control valve 121 therefore actuated, the first mentioned surface or arm of the rocker 156 will ride off its cam and the control valve will be returned to its normal or innermost position. It will be appreciated that although the different pairs of cams each have a fixed locus in relation to the associated control valve, by moving the cam sleeves 137, 138 rotationally in one direction or the other the timing of the actuation of the control valve may be advanced or retarded whilst if one of the sleeves is moved so as to displace the cams thereon with respect to the cams on the other sleeve the period of actuation of a control valve (and therefore the period of opening of an injection valve) may be regulated and preferably this regulation of period is effected by displacing the cams which come first into operation on the tappet in a valve actuating cycle.

From the foregoing description it will be clear that by rotation of the driving shaft 136, the tappet 147 will be carried successively over the different pairs of cams to actuate the control valves successively so that if the shaft 136 is driven in synchronism with the engine crankshaft (that is to say at half the engine crankshaft speed for a four-stroke cycle engine and at engine speed for a two-stroke cycle engine) the control valves and therefore the injector valves will be operated to effect the correct injection of fuel to the engine cylinders.

With the construction of tappet as described above the tappet may be easily centrifugally balanced. A further advantage of the tappet arrangement described lies in the fact that in view of the curved projection on the double armed rocker no lateral forces are applied to the control valves in operating them and thus all wear of the valves which would result through such lateral forces is avoided.

Figure 17:
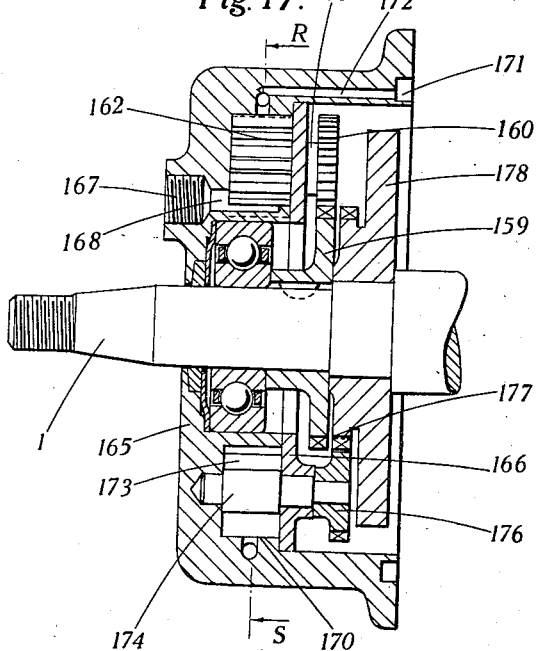
Fig. 17 is a longitudinal sectional view of a modified form of governor.
Figure 18:
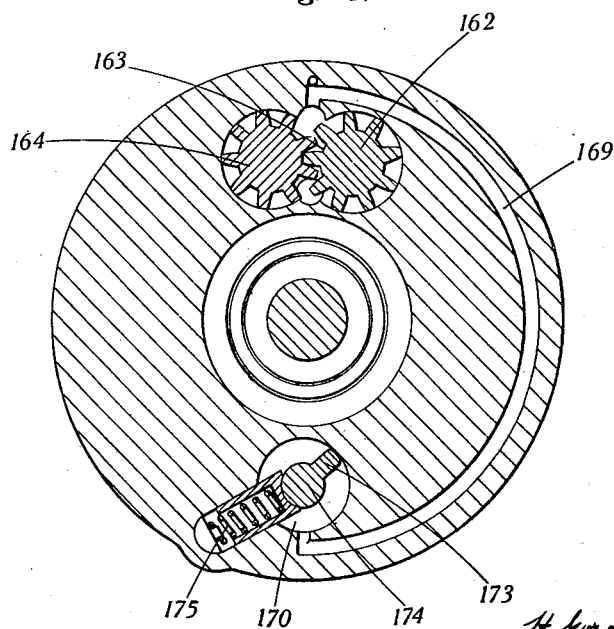
Fig. 18 is a cross section on the line R—S of Fig. 17.

A modified form of speed-responsive-governor is shown in Figs. 17 and 18 in which a toothed gear 159 mounted on the driving shaft meshes with a toothed gear 160 on a shaft 161 which also has secured thereon one element 162 of a gear pump 163 the other element 164 of which is mounted upon a shaft mounted in the casing 165 and a cover plate 166. The nipple 167 which is adapted to be connected to a fuel supply tank communicates with the inlet side of the pump 163 by a conduit 168 and the outlet side of the pump 163 communicates by way of a channel 169 in the casing 165 with a cylindrical bore 170 in the casing 165. Both the outlet side of the pump and the channel 169 also communicate with a groove 171 in the casing 165 by way of channel 172. Within the bore 170 an element 173 is rotatably mounted upon a shaft 174, a spring biased sealing member 175 being provided to divide the bore 170 into two portions. A toothed gear 176 is mounted upon the shaft 174 and engages a gear 177 on a cam plate 178 which is rotatably mounted upon the driving shaft. The cam plate 178 is biased, for example, by a spring (not shown) or in any other convenient manner in a direction opposite to that in which the fluid pressure on the element 173 tends to rotate it.

In the operation of this form of the invention fuel is drawn from the fuel tank by the gear pump 163 upon rotation of the driving shaft and is delivered by the pump to the bore 170 through the channel 169 and tends to rotate the element 173 and consequently the cam plate 178 against its bias.

The construction of the fuel pump shown in Figs. 1–8 may be varied in any suitable manner. For example, any suitable form of intercoupling between the regulating plunger and the pump delivery pressure varying means may be utilised in lieu of that hereinbefore described. For instance, the control ring 61 for controlling the pump delivery pressure as above described may be provided with gear teeth on its internal periphery arranged to mesh with a segment fixed on a spindle pivoted in a gear ring arranged coaxially with the control ring 61 and meshing with rack teeth on the regulating plunger, the spindle also having a crank pin which engages with the cam form in the cam plate; this arrangement will give the same pressure regulating effect as in the above described example.

Preferably the delivery strokes of the high pressure pump plungers are each arranged to occur in synchronism with the operation of a valve of the distributor to supply liquid to an injector. By this arrangement severe pressure fluctuations in the high pressure system may be avoided.

The cam forms on the cam plate 37 may be given any desired contour to suit particular requirements. For instance, an especially advantageous contour for the cam form 74 for operating the regulating plunger of the pump in the case of governor actuation is one which gives a high initial injection pressure, that is to say, the cam form is arranged to bring about a suitable displacement of the regulating plunger against its spring in the zero position to facilitate starting of the engine so that with minimum duration of opening of the injector valve in starting only a minimum quantity of fuel need be injected because as this is injected at a relatively high pressure complete atomisation results and easy starting is ensured. This avoids the disadvantage of known injection systems, particularly "jerk" pump systems, in which the effective injection pressure varies with the speed of the pump owing to the pump characteristic and is lowest when the engine is cranked over in starting, and which disadvantage resides in the fact that it is customary in order to ensure sufficient fuel being injected into the engine cylinder for starting purposes, to depress the "period" control pedal or lever which results in an unnecessarily large amount of poorly atomised fuel being injected into the engine cylinder with resultant poor starting properties due to the excess amount of fuel abstracting the heat of the compressed air, and also a smoky exhaust.

The cam form 74 is also preferably such that when it is moved by the governor running at idling speed it brings about a displacement of the regulating plunger to a position corresponding to a reduced injection pressure suited to the idling speed of the engine and this position of the regulating plunger may be maintained by the cam form over a predetermined lower speed range before increasing the injection pressure over the higher speed range.

The present invention makes it possible in a fuel injection system to maintain the quantity of fuel injected constant or variable in any desired and definitely predetermined ratio in relation to speed variations of the engine for a given angular displacement of the engine crankshaft.

It is further to be noted that the regulating means provided in accordance with the invention is not subject to the defects of those systems in which a predetermined pressure is maintained by a relief valve, namely, hunting about the predetermined pressure value and even sudden emptying of the high pressure conduit when the valve opens due to the kinetic energy developed in the fuel and the inertia of the valve, and the fact that even if a small amount of dirt becomes located between the valve and the valve seating the entire pressure regulation is disturbed and may even be made ineffective. Further, the regulating means operates satisfactorily in spite of any wear which may occur on the pump plungers because the regulating means will automatically correct the setting of the means for controlling the delivery volume in the pump to allow for any such wear.

The fuel relieved from the residual pressure line is used for lubrication purposes as well as any other seepage that is collected from the various working parts.

The distributor may be designed for supplying liquid fuel to an engine with any number of cylinders and in the case of engines having a large number of cylinders, for example, upwards of eight, more than one set of cam rings may be required.

No claim is made per se herein to the control means including the speed responsive governor and the master cam plate, or to the high pressure pump or to the distributor which individually form the subject matter of copending applications Serial Nos. 205,337, 205,336 and 205,338 respectively of even date herewith, application No. 205,336 having since been issued as Patent No. 2,229,804, on Jan. 28, 1941.

What we claim is:

1. Fuel injection apparatus for an internal combustion engine of the compression ignition type comprising in combination as a self-contained unit, a pump for delivering fuel at injection pressure, means for regulating said pressure, a distributor for controlling the supply of fuel at injection pressure, said distributor including means for varying the period of fuel injection and means for varying the time of commencement of fuel injection, and speed-responsive means for controlling at least one of the aforesaid means in accordance with predetermined requirements.

2. Fuel injection apparatus for an internal combustion engine of the compression ignition type comprising in combination as a self-contained unit, a pump for delivering fuel at injection pressure, means for regulating said pressure, a distributor for controlling the supply of fuel at injection pressure, said distributor including means for varying the period of fuel injection and means for varying the time of commencement of fuel injection, and speed-responsive means for controlling the fuel pressure regulating means, the means for varying the period of fuel injection and the means for varying the time of commencement of fuel injection in accordance with predetermined requirements.

3. Fuel injection apparatus according to claim 1 in which the speed-responsive means comprises a cam plate operatively connected with a speed-responsive governor, said cam plate having at least one, and preferably three, cam forms.

4. Fuel injection apparatus for an internal combustion engine of the compression ignition type comprising in combination as a self-contained unit, a pump for delivering fuel at injection pressure, means for regulating said pressure, a distributor for controlling the supply of fuel at injection pressure, means for varying the period of fuel injection, means for varying the time of commencement of fuel injection, a speed-responsive governor, and a cam plate operatively connected to said governor and having cam forms for controlling respectively the pressure regulating means, the means for varying the period of fuel injection and the means for varying the time of commencement of fuel injection.

5. Fuel injection apparatus according to claim 1 in which manual means is provided for varying the period of injection of the fuel.

6. Fuel injection apparatus according to claim 2 in which manual means is provided for varying the period of injection of the fuel.

7. Fuel injection apparatus according to claim 4 in which manual means is provided for varying the period of injection of the fuel.

8. Fuel injection apparatus for supplying liquid fuel to an internal combustion engine of the compression ignition type comprising a driving shaft and a plurality of sections assembled coaxially upon said shaft to form a compact body, one of said sections including a pump for supplying fuel at injection pressure, a second of said sections including a distributor for controlling the supply of fuel at injection pressure and a third of said sections including a speed responsive governor and a cam plate operatively connected thereto for controlling said distributor, said pump, distributor and governor being driven from said shaft.

9. Fuel injection apparatus according to claim 4 in which said governor comprises a pump serving as a primary pump to the pump for delivering fuel at injection pressure, a member movable in one direction in response to increase in the pressure of the discharge from said primary pump, and means for yieldingly biasing said member in the opposite direction.

10. Fuel injection apparatus for supplying liquid fuel to an internal combustion engine of the compression ignition type comprising in combination as a self-contained unit, a pump adapted to deliver fuel at injection pressure, means for regulating said pressure, a distributor including control valves operable in succession for controlling the supply of fuel at injection pressure, adjustable cams for effecting actuation of said control valves by their joint action, a speed-responsive governor, and a cam plate operatively connected to said governor for controlling said fuel pressure regulating means and adjustment of said cams.

11. Fuel injection apparatus for supplying liquid fuel to an internal combustion engine of the compression ignition type comprising in combination as a self-contained unit, a pump adapted to deliver fuel at injection pressure, means for regulating said pressure, a distributor including control valves operable in succession for controlling the supply of fuel at injection pressure, a common driving shaft for said pump and said distributor, cams for effecting actuation of said control valves by their joint action, at least one of said cams being adjustable relatively to said driving shaft, a speed-responsive governor, and a cam plate operatively connected to said governor for controlling adjustment of each adjustable cam and also controlling said fuel pressure regulating means.

12. Fuel injection apparatus for supplying liquid fuel to an internal combustion engine of the compression ignition type comprising in combination as a self-contained unit, a pump for delivering liquid fuel at injection pressure, means for positively varying the quantity of fuel pumped by said pump, a regulating plunger responsive to the pressure of the fuel delivered by the pump, means connecting said plunger to said quantity varying means, a distributor for controlling the supply of fuel at injection pressure, a speed-responsive governor, a cam plate operatively connected to said governor, cam forms on said cam plate, shaped according to predetermined requirements, means connecting one of said cam forms to said regulating plunger and means connecting at least one other of said cam forms to said distributor.

13. Fuel injection apparatus for an internal combustion engine of the compression ignition type comprising in combination as a self-contained unit, a pump for delivering fuel at injection pressure, means for regulating said pressure, a distributor for controlling the supply of fuel at injection pressure, means for varying the period of fuel injection, means for varying the time of commencement of fuel injection, a speed-responsive governor, a cam plate operatively connected to said governor and having cam forms for controlling respectively the pressure regulating means and the means for varying the period and time of commencement of fuel injection, and a manually operable member for actuating the means for varying the period of fuel injection.

HAMILTON GORDON.
STANLEY HERBERT ATTWOOD.